(12) United States Patent
Bringewatt et al.

(10) Patent No.: US 11,174,588 B2
(45) Date of Patent: Nov. 16, 2021

(54) METHOD AND APPARATUSES FOR SUPPLYING ITEMS OF LAUNDRY TO A FEEDING MACHINE

(71) Applicant: Herbert Kannegiesser GmbH, Vlotho (DE)

(72) Inventors: Wilhelm Bringewatt, Porta Westfalica (DE); Markus Nolte, Hille (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 16/687,861

(22) Filed: Nov. 19, 2019

(65) Prior Publication Data

US 2020/0165768 A1  May 28, 2020

(30) Foreign Application Priority Data

Nov. 23, 2018 (DE) .......................... 102018129570.7

(51) Int. Cl.
*D06F 67/04* (2006.01)
*B65G 19/02* (2006.01)
(Continued)

(52) U.S. Cl.
CPC .......... *D06F 67/04* (2013.01); *B65G 19/025* (2013.01); *B65G 47/22* (2013.01); *D06F 95/00* (2013.01); *B65G 2201/0229* (2013.01)

(58) Field of Classification Search
CPC ....... D06F 67/04; D06F 95/00; B65G 19/025; B65G 47/22; B65G 2201/0229
See application file for complete search history.

(56) References Cited

U.S. PATENT DOCUMENTS 3,399,472 A * 9/1968 Evans ..................... D06F 67/04
                                                                  38/143
3,568,342 A     3/1971 Betsch
(Continued)

FOREIGN PATENT DOCUMENTS

DE        77950 A1   12/1970
DE     1760450 B1   12/1970
(Continued)

OTHER PUBLICATIONS

European Patent Office, Europaischer Recherchenbericht (searchin a related application), Apr. 3, 2020.

*Primary Examiner* — Lynn E Schwenning
(74) *Attorney, Agent, or Firm* — Laurence P. Colton; Smith Tempel Blaha LLC

(57) ABSTRACT

The automatic supply of items of laundry to a feeding machine for supplying the items of laundry to a mangle requires the formation of adjacent corners of an edge of the item of laundry, which edge is to be spread upstream of the feeding machine, which hitherto has not been able to be achieved automatically with sufficient reliability. The invention brings the respective item of laundry into a U-shaped configuration before same is supplied to the feeding machine and, starting from said configuration, to stretch apart said item of laundry with a spreading device having a conveyor cascade. This reliably forms the adjacent corners of the edge, which is to be stretched out, of the item of laundry, said corners being required for automatically feeding the item of laundry into the feeding machine. A reliable automatic supply of the respective item of laundry to the feeding machine is therefore ensured.

17 Claims, 3 Drawing Sheets

(51) Int. Cl.
*B65G 47/22* (2006.01)
*D06F 95/00* (2006.01)

(56) References Cited

U.S. PATENT DOCUMENTS

| | | | | |
|---|---|---|---|---|
| 4,050,173 A | * | 9/1977 | Olsen | D06F 67/04 38/143 |
| 4,979,868 A | * | 12/1990 | Ueda | B61B 10/025 38/12 |
| 5,169,282 A | | 12/1992 | Ueda | |
| 5,515,627 A | * | 5/1996 | McCabe | D06F 67/04 38/143 |
| 8,732,995 B2 | * | 5/2014 | Herzog | D06F 67/04 38/143 |
| 2008/0298930 A1 | | 12/2008 | McCabe | |
| 2017/0204555 A1 | * | 7/2017 | Tanii | D06F 67/04 |

FOREIGN PATENT DOCUMENTS

| | | |
|---|---|---|
| GB | 2081749 A | 2/1982 |
| WO | 2005038121 A2 | 4/2005 |

\* cited by examiner

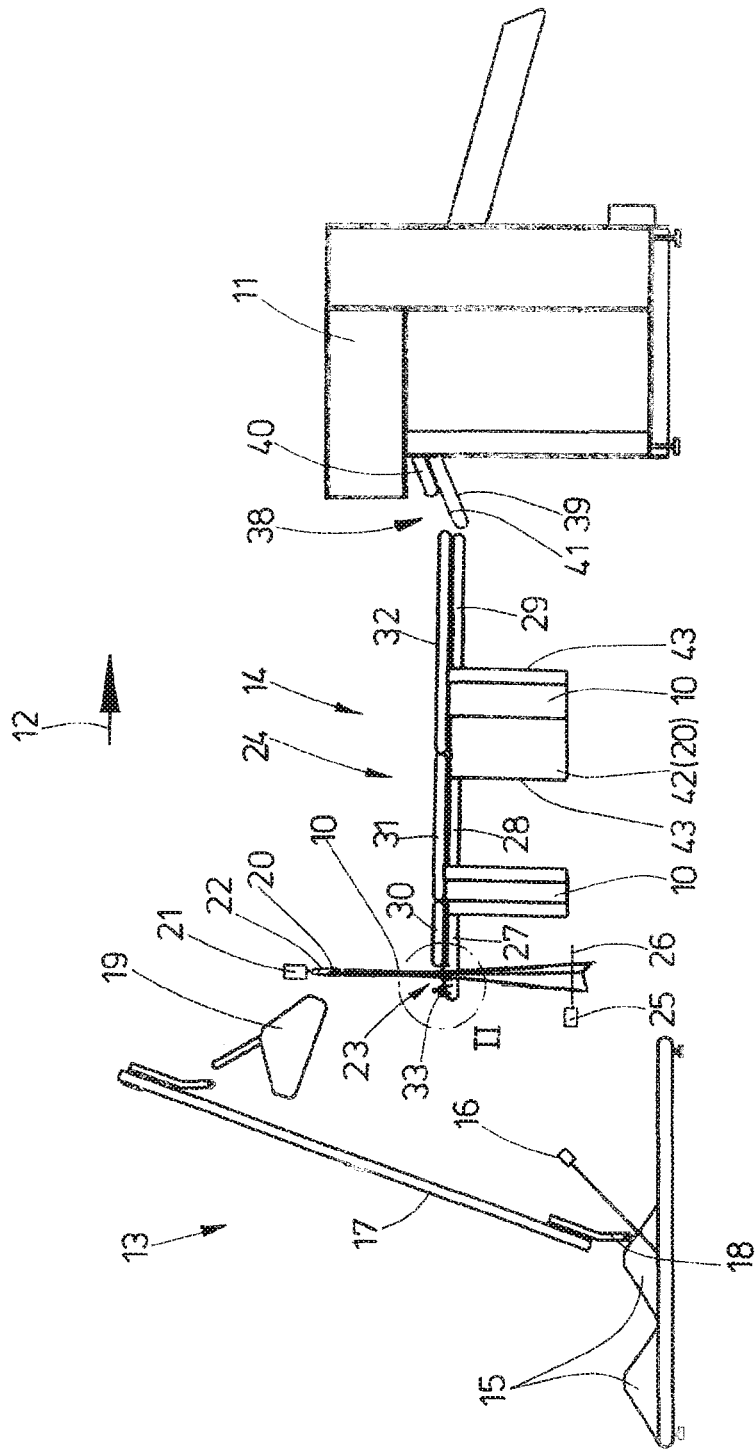

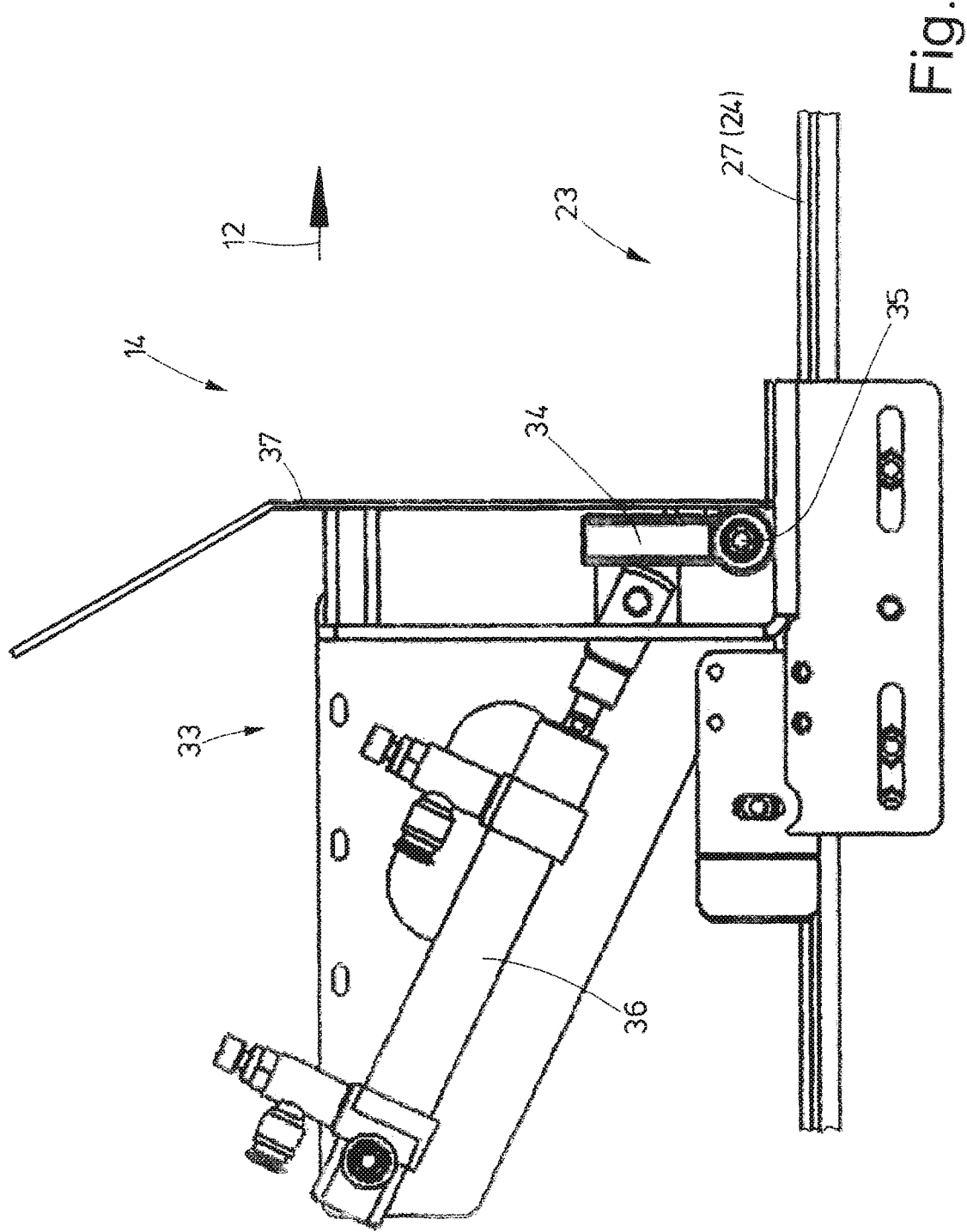

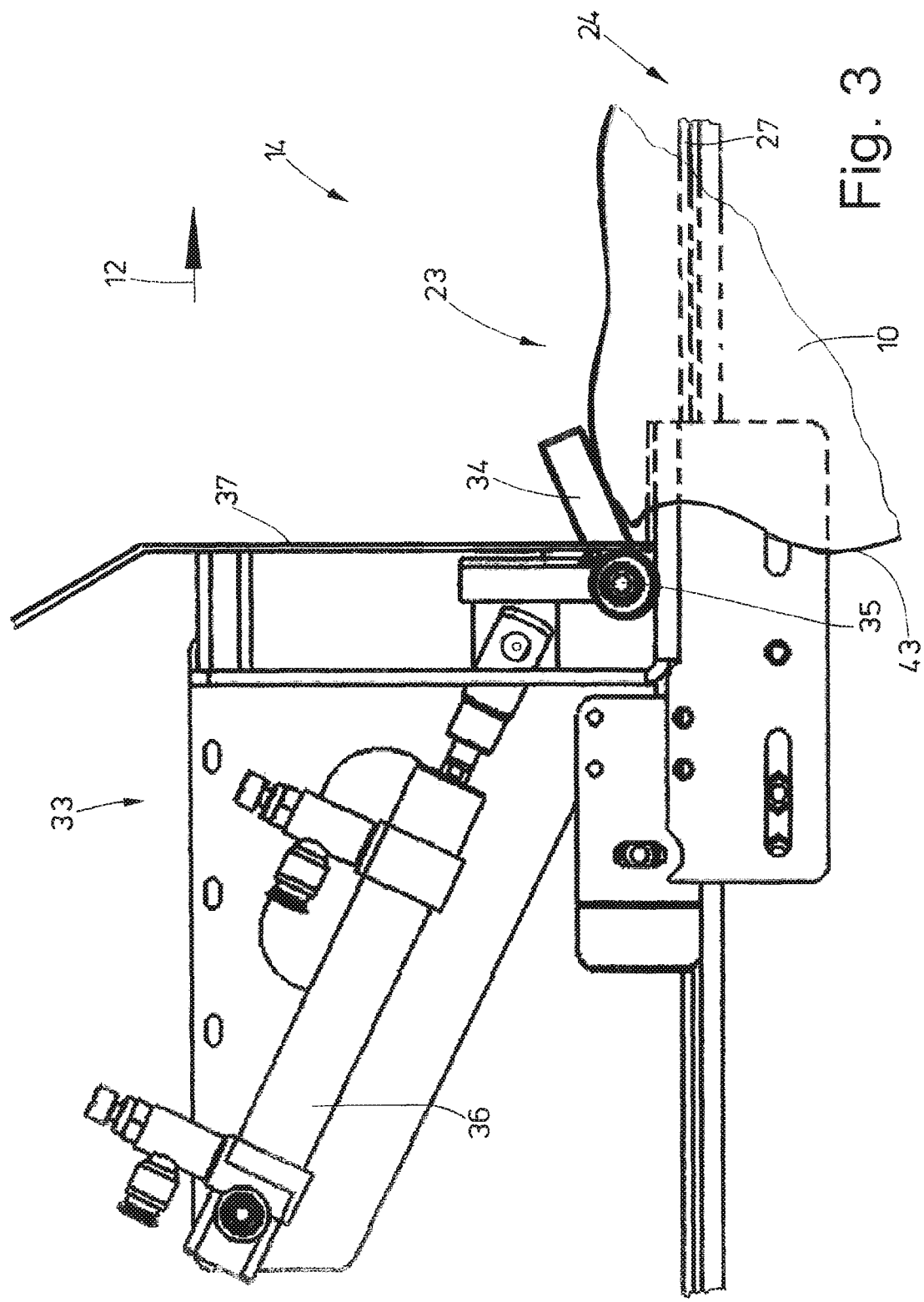

METHOD AND APPARATUSES FOR SUPPLYING ITEMS OF LAUNDRY TO A FEEDING MACHINE

CROSS REFERENCE TO RELATED APPLICATIONS

This application claims priority on and the benefit of German Patent Application No. 10 2018 129 570.7 having a filing date of 23 Nov. 2018.

BACKGROUND OF THE INVENTION

Technical Field

The invention relates to a method for supplying items of laundry to a feeding machine for spreading out and feeding the item of laundry by two adjacent corners of a leading edge into a laundry treatment device, in particular a mangle, the preferably automatically separated item of laundry being supplied to the feeding machine. Furthermore, the invention relates to an apparatus for supplying items of laundry to a feeding machine for spreading and feeding the item of laundry by two adjacent corners of a leading edge into a laundry treatment device, in particular a mangle.

Prior Art

Feeding machines serve to spread out items of laundry and to supply same in the spread-out state to a laundry treatment device, in particular a mangle.

It is endeavored for rationalization reasons to supply items of laundry, specifically preferably washed items of laundry, in a very substantially automated manner to the feeding machine. This has to take place by adjacent corners of an edge of the item of laundry.

It is known to automatically grasp the items of laundry, which conventionally arise in the form of a laundry batch or laundry heap after the washing and optionally draining, from the laundry heap or laundry batch and to separate them in the process or subsequently. It has previously proven problematic to supply the respective separated item of laundry, which is preferably hanging on a clip, to the feeding machine automatically because this has to take place by adjacent corners of that edge of the item of laundry which is stretched out by the feeding machine and is supplied to the laundry treatment device, in particular mangle. This edge which is then the leading edge in the supply direction of the item of laundry to the mangle or the like is then defined as the front edge of the item of laundry.

BRIEF SUMMARY OF THE INVENTION

The invention is based on the object of providing a method and an apparatus for at least very substantially automatically, preferably fully automatically, supplying items of laundry to a feeding machine.

A method for achieving this object is a method for supplying items of laundry to a feeding machine for spreading out and feeding the item of laundry by two adjacent corners of a leading edge into a laundry treatment device, in particular a mangle, the preferably automatically separated item of laundry being supplied to the feeding machine, wherein two adjacent corners of an edge are formed on the separated item of laundry before the latter is supplied to the feeding machine, by the item of laundry being brought into a U-like configuration and, in the process, being stretched apart in the direction of feeding of the item of laundry into the laundry treatment device.

According thereto, it is provided to form two adjacent corners of an edge on the separated item of laundry before same is supplied to the feeding machine, by the item of laundry being brought into a U-like or U-shaped configuration and then being stretched apart in the supply direction. Transferring the item of laundry into a U-like configuration results in the formation, at the end of adjacent limbs, of borders and/or ends, in particular tips, of the item of laundry, in the regions of which adjacent corners of an edge of the item of laundry lie. By subsequent stretching apart of the item of laundry, at least the ends of the two limbs are untangled and the sought adjacent corners of the edge emerge. In particular, the adjacent corners are exposed in such a manner that the adjacent corners of an edge of the item of laundry are formed out of the ends or tips. As a result, the item of laundry can then be supplied preferably fully automatically to the feeding machine which then spreads out the item of laundry by the corners obtained according to the method according to the invention and supplies same to the laundry treatment device.

In the method according to the invention, adjacent corners of a rear edge of the respective item of laundry are preferably formed, said rear edge then becoming the front edge of same during the supplying of the item of laundry to the feeding machine and a reorientation taking place in the process of the item of laundry.

The method can be developed in such a manner that, after the separating, the item of laundry hangs down from a clip which pulls said item of laundry over a spreading device, which subsequently spreads apart the item of laundry, in such a manner that, in the process, the U-shaped configuration of the item of laundry is formed. After the item of laundry hanging down from the clip is preferably partially pulled on or pulled over the spreading device, the clip then releases the item of laundry. This creates an advantageous possibility for forming the U-shaped starting configuration of the item of laundry.

The item of laundry hanging on the clip is preferably deposited at the start of the spreading device with the item of laundry located approximately centrally above the spreading device by the clip moving in a transverse direction with respect to the supply direction of the item of laundry to the feeding machine and opening of the clip. The U-shaped configuration of the item of laundry comes about here at the start of the spreading device. This depositing takes place with a region of the item of laundry in the vicinity of the center, which can ideally also be in the central region of same. The region in the vicinity of the center is preferably located in a central region of that edge which is bounded by the corners to be formed of the item of laundry.

A preferred possibility of refining the method makes provision for the item of laundry to be transported further in the supply direction by the spreading device. The item of laundry is spread apart in the process in the supply direction by the spreading device. In particular, from a starting situation, in which the item of laundry placed in the U-shaped configuration on the spreading device still has regions lying one above another and/or overlapping, said regions are entirely or at least for the most part eliminated. As a result, over the course of the spreading device, opposite edges of the item of laundry running in the supply direction are formed. The original ends and/or tips of the item of laundry are released in the process and at least two adjacent corners, preferably all four corners, of the item of laundry are spaced apart from one another. Adjacent corners of at least one edge running transversely with respect to the supply direction are thus formed. Said edge is initially still the rear edge of the item of laundry running transversely with respect to the supply direction.

The method can preferably be configured in such a manner that, in the spreading device, the item of laundry is spread apart by at least two belt conveyors following one another in the supply direction during the transport in the supply direction to the feeding machine. As a result, the item of laundry is transported in the direction of the feeding machine and the item of laundry is stretched apart at least for the most part simultaneously. The cycle time for supplying the item of laundry to the feeding machine is thereby not extended, or at least not significantly extended, by the stretching out of the item of laundry.

It is particularly advantageous to allow the speed of the belt conveyors following one another in the supply direction, in particular also of belt conveyors at least partially lying above one another (sandwich conveyors), to increase in the supply direction. As a result, in the case of the slower belt conveyor, a slip arises between its at least one conveyor belt and the item of laundry. Said slip leads to the item of laundry being stretched apart in the supply direction and/or to at least assisting the stretching apart of the item of laundry.

According to an advantageous possibility of developing the method, it is provided to drive at least one first belt conveyor at least during the initial stretching apart of the item of laundry counter to the supply direction, in particular in the opposite direction to the at least one belt conveyor following the first belt conveyor. A rear part of the item of laundry still lying on the first belt conveyor is moved in the process by the first belt conveyor counter to the supply direction while the remaining part of the item of laundry lying on the following belt conveyor is transported by at least said following conveyor in the supply direction. This brings about a very effective stretching apart and/or stretching of the item of laundry, which at least promotes the formation of the adjacent corners of a preferably rear edge of the item of laundry running transversely with respect to the supply direction.

A preferred possibility of refining the method makes provision for the central region or region in the vicinity of the center of the item of laundry and resting on the beginning of the first belt conveyor to be secured and/or held back preferably at a rearmost point during the initial stretching out of the item of laundry. As a result, the front large portion of the item of laundry is transported further in the supply direction by at least one belt conveyor. An effective initial spreading out of the item of laundry occurs here. The fixing of the rearmost point of the item of laundry at the beginning of the first belt conveyor is then released, and therefore the item of laundry is then spread out further and in particular also finally by the belt conveyors following one another and by their transport speeds increasing in the supply direction.

An apparatus for achieving the object mentioned at the beginning is an apparatus for supplying items of laundry to a feeding machine for spreading and feeding the item of laundry by two adjacent corners of a leading edge into a laundry treatment device, in particular a mangle, with at least one conveyor which transports the respective item of laundry in the supply direction, in which the feeding machine transports the item of laundry to the laundry treatment device, to the feeding machine, which comprises a conveyor with at least one clip for hanging up a respective item of laundry, and a conveyor cascade, wherein the transport speed of the conveyor cascade increases in the supply direction.

This apparatus is distinguished by a conveyor with at least one clip for hanging up the respective item of laundry and a conveyor cascade. The belt conveyors following one another in the supply direction to the laundry treatment device have different transport speeds, wherein the front first belt conveyor operates at a lower transport speed than the subsequent belt conveyor. If at least one further belt conveyor follows in the supply direction, the transport speed thereof is in turn greater than that of the central (second) belt conveyor. The same applies with more than three belt conveyors following one another. By means of the different transport speeds of the belt conveyors following one another, the transport speed increases successively, in particular gradually, in the supply direction. This solely or in combination with individual measures or a plurality of measures mentioned further below leads to the effective stretching apart of the respective item of laundry in order to form at least two adjacent corners of an edge, specifically in particular transverse edge, of the item of laundry.

An advantageous possibility of refining the apparatus makes provision for the or each belt conveyor following the first belt conveyor to be designed as a sandwich-like double belt conveyor with a lower belt conveyor and an upper belt conveyor. The upper and the lower belt conveyors can be formed identically or else differently, in particular with different lengths. In particular, it is conceivable for the roughness or coefficients of friction of the belts coming into contact with the item of laundry to differ.

The at least one sandwich-like belt conveyor makes it possible to exert a targeted holding force on that part of the respective item of laundry which lies in between, and to adjust the respective sandwich-like belt conveyor in such a manner that it pulls strongly on the item of laundry, in particular on the respective leading portion of same. The respective item of laundry is thereby effectively stretched overall in the supply direction by the belt conveyors following one another, especially because of their different transport speed, which becomes greater in the supply direction, and therefore the item of laundry can be stretched apart to the required extent. The distance between the upper and lower belt conveyor of the sandwich-like belt conveyor can also be changed in order to undertake adaptations to different items of laundry, in particular in respect of their position, number and the type of fabric thereof (smooth fabric or terrycloth).

It is conceivable to develop the apparatus in such a manner that the first belt conveyor can be reversed in its transport direction. In particular, the first belt conveyor after the item of laundry is pulled and placed thereon can thus be driven with a transport direction which runs counter to the supply direction. Part of the item of laundry can thereby be moved to the beginning of the first belt conveyor, specifically to such an extent that part of the item of laundry hangs down before the beginning of the first belt conveyor. This increases the friction of the item of laundry on that side of the belt of the first belt conveyor that is directed with respect thereto.

It is particularly advantageous to drive the first belt conveyor in a conveying direction, which points counter to the supply direction, in an opposed manner with respect to the at least one following belt conveyor if a front part of the item of laundry is already lying on the following belt conveyor, in particular in a gap between the upper and lower belt conveyor of the following belt conveyor which is configured in the manner of a sandwich. This particularly effectively stretches or spreads out that part of the item of laundry which still lies upstream of the following second belt conveyor and/or the rear part of the item of laundry partially hanging down upstream of the first belt conveyor. This leads to a rear part of the item of laundry being stretched out on the first belt conveyor and a leading part of the item of laundry being stretched out on at least the second belt conveyor following the first belt conveyor. This is particularly effective if the second belt conveyor and/or optionally each following belt conveyor is or are configured as sandwich-like belt conveyors with an upper and lower belt conveyor.

Another conceivable possibility of refining the apparatus makes provision to assign a retaining means to the first belt conveyor, in particular to the starting region thereof.

The apparatus can be provided with a controller which controls the retaining device as a function of the progressive stretching apart of the item of laundry. For example, the retaining device can secure the rear border region of the item of laundry until the at least one belt conveyor following the first belt conveyor exerts a tensile force on the item of laundry, said tensile force extending as far as the retaining device, and/or a certain tensile force is exerted on the rear of the item of laundry which is still fixed by the retaining device. This firstly ensures that the item of laundry is sufficiently stretched apart and secondly prevents an excessive tensile force on the item of laundry by it not being possible for the item of laundry to be excessively extended as it is being stretched apart and thereby damaged.

BRIEF DESCRIPTION OF THE DRAWINGS

A preferred exemplary embodiment of the invention will be explained in more detail below with reference to the drawing, in which:

FIG. 1 shows a perspective illustration of an apparatus according to the invention;

FIG. 2 shows an enlarged detail II from FIG. 1; and

FIG. 3 shows an illustration of the detail of FIG. 2 in another method stage.

DETAILED DESCRIPTION OF PREFERRED EMBODIMENTS

The apparatus shown in the figures serves for automatically supplying and/or feeding items of laundry 10 into a feeding machine 11 for spreading out and supplying the items of laundry 10 to a mangle or to another laundry treatment device.

The apparatus according to the invention is basically suitable for items of laundry 10 of all types, but preferably for "flat items of laundry". These are especially table tops, serviettes, bed covers, pillow cases and bed sheets.

The apparatus has an automatic separator 13 upstream of the feeding machine 11, as seen in the supply direction 12, and a following spreading device 14. The spreading device 14 is located between the separator 13 and the feeding machine 11. The spreading device 14 spreads out the respective item of laundry 10, in particular in the supply direction 12, and automatically transfers it as a spread-out item of laundry 10 to the feeding machine 11.

The separator 13 serves for the automatic targeted grasping preferably of an individual item of laundry 10 from a laundry heap 15. The preferably one respective item of laundry 10 is automatically grasped from the laundry heap 15 in a manner controlled on the basis of at least one photo of an image-capturing device, for example at least one camera 16 in the vicinity of the laundry heap 15. On the basis of the photos taken by the camera 16, an image evaluation device controls a gripper 18 which is movable to and fro along a rising section 17. The gripper 18 transfers the, preferably individual, item of laundry 10 grasped by it to a following preparation device 19 of the separator 13. The preparation device 19 optionally carries out separation of a plurality of items of laundry 10 grasped simultaneously by the gripper 18 and holds the separated (single) item of laundry 10 ready at a first corner 20 for automatically transferring or passing through the spreading device 14. The item of laundry 10 hangs freely downward here from the first corner 20 held by the preparation device 19 of the separator 13.

The spreading device 14 following the separator 13 has a horizontal rail 21 which runs transversely with respect to the supply direction 12 and on which at least one clip 22 is movable to and fro transversely with respect to the supply direction 12. The rail 21 with the clip 22 is arranged, as seen in the supply direction 12, downstream of the location at which the preparation device 19 of the separator 13 holds ready an item of laundry 10, hanging by way of the first corner 20, in such a manner that the item of laundry 10 can be automatically transferred by the preparation device 19 by the first corner 20 to the clip 22 on the rail 21 or the clip 22 can pick up the first corner 20 of the item of laundry 10 from the preparation device 19.

After being picked up by or on the spreading device 14, the item of laundry 10 hangs down from the first corner 20 on the clip 22. The height of the rail 21 with the clip 22 is selected here in such a manner that even the largest items of laundry 10 can hang down freely from the clip 22 without touching the ground. The clip 22 is located here in such a position on the rail 21 that the item of laundry 10 hanging down from the clip 22 is located laterally next to a front depositing region 23 of a conveyor cascade 24 of the preparation device 19, the conveyor cascade extending from said depositing region in the supply direction 12 to the feeding machine 11.

A horizontal sensor beam 26 which emerges from a sensor 25, in particular transmitter and, for example, forms a light barrier, or another detection means, for example a camera, is located wherever the item of laundry 10 hangs down from the clip 22 next to the depositing region 23 of the conveyor cascade 24. The sensor beam 26 and in particular the sensor 25 generating the latter are arranged at such a distance from the ground that even small items of laundry 10 interrupt the sensor beams 26, i.e. project into the light barrier, if the item of laundry 10 is still located next to the depositing region 23.

The clip 22 holding the item of laundry 10 is moved along the rail 21 transversely with respect to the supply direction 12, wherein a central region of the item of laundry 10 is pulled transversely over the depositing region 23 at the beginning of the conveyor cascade 24. If the lower end of the item of laundry 10 releases the sensor beam 26 here, the length of the item of laundry 10 hanging down from the clip 22, with it also being possible for the width of the item of laundry 10 to be involved, can be determined by computer from the known fixed positions of the sensor 25 and/or of the sensor beam 26 and of the clip 22, in particular the height of the latter above the ground. Subsequently, the clip 22 continues to be moved along the rail 21 in such a manner that that part of the item of laundry 10 which is located under the depositing region 23 is furthermore pulled in a transverse direction over the depositing region 23.

The further movement of the clip 22 along the rail 21 is stopped when half of the length or width of the item of laundry 10 determined by computer, i.e. a central region thereof, is located approximately above the depositing region 23. The clip 22 then releases the first corner 20 of the item of laundry 10. The item of laundry 10 is thereby deposited approximately centrally, preferably with a central region or a region in the vicinity of the center, over the depositing region 23. The item of laundry 10 is then located on the depositing region 23 in a U-shaped or U-like configuration with end portions, preferably of approximately identical length, hanging down on both sides from the depositing region 23.

The conveyor cascade 24 consists of a plurality of belt conveyors 27 arranged one behind another and one above another. They can be of identical design, in particular of identical length, or—as in the exemplary embodiment shown—the belt conveyors, which follow one another in the supply direction 12, of the conveyor cascade 24 can have an increasingly greater length.

In the exemplary embodiment shown, the conveyor cascade 24 is formed from three lower belt conveyors 27, 28 and 29 following one another in the supply direction 12 and upper belt conveyors 30, 31 and 32 which lie thereabove and likewise follow one another in the supply direction 12. The lower belt conveyors 27 to 29 and upper belt conveyors 30 to 32 arranged one above another in the manner of a sandwich thus form three pairs of belt conveyors following one another of the conveyor cascade 24. It is also conceivable for the conveyor cascade 24 to have only two or else more than three pairs of belt conveyors. The lengths of the lower belt conveyors 27, 28, 29 increase in the supply direction 12. Similarly, the lengths of the upper belt conveyors 30, 31, 32 increase in the supply direction 12. The lower belt conveyor 28 and the upper belt conveyor 31 assigned to the latter are identical in length. Similarly, the lower belt conveyor 29 and the upper belt conveyor 32 assigned to the latter are identical in length. However, the upper belt conveyor 30 assigned to the initial (first) lower belt conveyor 27 is shorter than the lower belt conveyor 27 in order to form the depositing region 23 which is exposed or is left free by the upper belt conveyor 30.

In the exemplary embodiment shown, all of the belt conveyors 27 to 32 of the conveyor cascade 24 run in an identical horizontal plane. However, it is conceivable for all of the belt conveyors 27 to 32 of the conveyor cascade 24 to run, as seen in the supply direction 12, in a rectilinearly rising or falling manner to the feeding machine 11. It is also conceivable for the directions of the lower belt conveyors 27 to 29 and/or upper belt conveyors 30 to 32 following one another to differ from one another, i.e. not to form a continuous straight line. Finally, it is also conceivable for at least some belt conveyors 27 to 32 to have an arcuate or curved profile.

All of the belt conveyors 27 to 32 of the conveyor cascade 24 are identical in width. The belt conveyors 27 to 32 have a width which can be referred to as narrow in relation to their length, and therefore a narrow, strip-like conveyor cascade 24 arises. As a result, over the course of the conveyor cascade 24, the items of laundry 10 can hang down on both sides laterally from the conveyor cascade 24 with preferably identical lengths. The items of laundry 10 maintain their U-shaped configuration for the entire conveying distance of the conveyor cascade 24 as far as the feeding machine 11.

All of the belt conveyors 27 to 32 following one another of the conveyor cascade 24 are arranged lying one above another, and therefore the runs thereof, i.e. the upper runs of the lower belt conveyors 27 to 29 and the lower runs of the upper belt conveyors 30, 31 and 32 lie against one another while no items of laundry 10 are located between the lower belt conveyors 27 to 29 and the upper belt conveyors 30 to 32. The consequence is that items of laundry 10 can be transported further in the supply direction 12 clamped between the lower belt conveyors 27 to 29 and upper belt conveyors 30 to 32 by the runs of same directed towards one another, with the items of laundry 10 being carried along by the frictional connection between the upper runs of the lower belt conveyors 27 to 29 and the lower runs of the upper belt conveyors 30 to 32.

The front lower belt conveyor 27 and the upper belt conveyor 30 lying thereabove are driven with the same revolving speed of their runs. The same applies to the lower belt conveyor 28 and the upper belt conveyor 31 assigned thereto and to the lower belt conveyor 29 and the second belt conveyor 32 assigned thereto. However, the revolving speeds of the runs of the individual belt conveyors 27 and 30, 28 and 31 and 29 and 32 arranged one above another in pairs increase in the supply direction 12. That is to say, the revolving speed of the runs of the lower belt conveyor 28 and of the upper belt conveyor 31 assigned thereto is greater than the revolving speed of the initial lower belt conveyor 27 and of the upper belt conveyor 30 assigned thereto. By contrast, the revolving speed of the runs of the lower belt conveyor 29 located upstream of the feeding machine 11 and of the upper belt conveyor 32 assigned to said lower belt conveyor is greater than the revolving speed of the runs of the central lower belt conveyor 28 and of the upper belt conveyor 31 assigned to the latter.

It is also conceivable for the revolving direction of the front, initial lower belt conveyor 27, as seen in the supply direction 12, and of the upper belt conveyor 30 assigned thereto to be able to be reversed when required such that the conveying direction of the front belt conveyors 27 and 30 is directed at times, in particular temporarily, counter to the supply direction 12 and the transport directions of the pairs of belt conveyors 28 and 31 and 29 and 32.

The apparatus shown here has a retaining device 33 which is illustrated in detail in FIGS. 2 and 3. The retaining device 33 is arranged at the beginning of the conveyor cascade 24, specifically at a, preferably outermost, location, facing the separator 13, of the depositing region 23 of the item of laundry 10 on the conveyor cascade 24 and directly downstream of the preparation device.

The retaining device 33 has at least one clamping finger 34. The clamping finger 34 is designed in such a manner that it securely clamps the central portion of the respective item of laundry 10, said portion resting on the depositing region 23, by way of a border region directed toward the clamping finger 34 and can thereby hold back said portion at least initially. The item of laundry 10 which has not yet been spread out can be temporarily fixed on the depositing region 23 by the clamping finger 34.

In the case of the retaining device 33 shown here, the clamping finger 34 is pivotable about a horizontal axis of rotation 35 running transversely with respect to the supply direction 12. This takes place according to the illustrations of FIGS. 2 and 3 by a pneumatic cylinder 36. However, the clamping finger 34 can also be pivoted by another drive, for example a servo motor acting on the axis of rotation 35.

FIG. 2 illustrates the pivoted-up starting position of the clamping finger 34. The clamping finger 34 is then located completely behind a guide plate 37 running partially vertically. The guide plate 37 stands vertically above the depositing region 23 and delimits that end of the depositing region 23 which faces the separator 13.

FIG. 3 shows the clamping finger 34 in its active position in which it securely clamps a rear region of the central part of the item of laundry 10, which part is deposited on the depositing region 23, and thereby holds said part back. The clamping force of the clamping finger 34 can be varied and can be adjusted by the air pressure with which the pneumatic cylinder 36 is charged. Said air pressure of the pneumatic cylinder 36 is maintained, in particular without change, preferably for the duration of the intended clamping of the item of laundry 10.

The retaining device 33 is assigned at least one sensor or the like which controls the stopping of the clamping of the item of laundry 10 by the clamping finger 34. This can take place by the tensile force which the item of laundry 10 being held back exerts on the clamping finger 34, but also, alternatively or additionally, in accordance with how far a front part of the item of laundry 10 which is not fixed by the clamping finger 34 has already entered the conveyor cascade 24, namely between one or more of the lower belt conveyors 27, 28, 29 or upper belt conveyors 30, 31, 32.

In the case of the apparatus shown here with the retaining device 33, the lower belt conveyor 27 or optionally the upper belt conveyor 30 assigned thereto does not need to be driven in a manner directed counter to the supply direction 12 in order to initially spread out the item of laundry 10. The lower belt conveyor 27 and/or the upper belt conveyor 30 then do not need to be reversible.

For the automatic transfer of the item of laundry 10 stretched out by the preparation device 19 to the feeding machine 11, that end of the conveyor cascade 24 which faces the feeding machine 11 is arranged directly upstream of a loading conveyor 38 of the feeding machine 11. In the exemplary embodiment shown in FIG. 1, the loading conveyor 38 is formed from a lower belt conveyor 39 and an upper belt conveyor 40 arranged in a sandwich-like manner thereabove. The two belt conveyors 39 and 40 are preferably the same width as the belt conveyors 27 to 32 of the conveyor cascade 24, and therefore the item of laundry 10 which has been spread out and is still lying in a U-shaped configuration on the conveyor cascade 24 can be automatically transferred in said U-shaped configuration by the conveyor cascade 24 to the loading conveyor 38.

In the exemplary embodiment shown, the lower belt conveyor 39 of the loading conveyor 38 of the feeding machine 10 is somewhat longer than the upper belt conveyor 40 by the lower belt conveyor 39 protruding in relation to the upper belt conveyor 40 in the direction of the conveyor cascade 24 in order to form a transfer region 41 at which the item of laundry 10 can be automatically transferred to the spreading device 14 by the conveyor cascade 24. The feeding machine 11 can have a loading conveyor 38 or a plurality of loading conveyors 38 located at a distance next to one another. In the case of a plurality of loading conveyors 38 located next to one another, a spreading device 14 is provided for each loading conveyor 38. A separator 13 with a preparation device 19 can optionally also be assigned to each spreading device 14. It is also conceivable to supply all of the spreading devices 14 arranged next to one another in an alternating manner with items of laundry 10 by a separator 13 by the rail 21 having a length such that it extends along upstream of all of the spreading devices 14 located next to one another. It is also conceivable to provide only a single spreading device 14 which alternately supplies all of the loading conveyors 38 of the feeding machine 11 and items of laundry 10.

The method according to the invention will be explained below with reference to the apparatus shown in FIGS. 1 to 3:

The respective item of laundry 10 is stretched apart or stretched in the supply direction 12 by the spreading device 14 before being automatically transferred to the feeding machine 11. For this purpose, the item of laundry 10, initially in the state still bundled together, in particular if it is still in tubular form, is deposited in a U-shaped configuration over the depositing region 23 of the conveyor cascade 24 of the spreading device 14.

Before the item of laundry 10 is deposited in a U-shaped configuration on the depositing region 23, the item of laundry 10 hangs down from a first corner 20 from the clip 22 which is movable on the rail 21. When the item of laundry 10 is moved laterally to the depositing region 23 by movement of the clip 22 on the rail 21 transversely with respect to the supply direction 12, the lowermost end of the item of laundry 10 is detected by the light barrier, for example the sensor beam 26 of the sensor 25, and approximately the extent to which the lower end of the item of laundry 10 hangs down from the clip 22 is determined therefrom by computer. The item of laundry 10 is then moved further transversely with respect to the supply direction 12 by a clip 22 which is movable longitudinally in the rail 21 until approximately half of the extent, determined by computer, of the distance of the lower end of the item of laundry 10 from the clip 22 is located above or on the depositing region 23. This extent corresponds to half the length or width of the item of laundry 10 transversely with respect to the supply direction 12. By opening of the clip 23, the item of laundry 10 is then released from same, with the item of laundry 10 being automatically deposited in a U-shaped configuration on the depositing region 23. Opposite end-side partial regions of the item of laundry 10 of preferably approximately identical length then project downward from the depositing region 23 on both sides while a narrow central part of the item of laundry 10 lies on the depositing region 23.

Starting from the item of laundry 10 deposited in the U-shaped configuration on the depositing region 23, the item of laundry 10 is then automatically stretched out or spread out in the supply direction 12 by means of the spreading device 14 with belt conveyors 27 to 32 of the conveyor cascade 24 being driven in the supply direction 12. For this purpose, when the clamping finger 34 is pivoted against the item of laundry 10, a rear region of the central part of the item of laundry 10 lying on the depositing region 23, said rear region facing the retaining device 33, is first of all temporarily and/or initially securely clamped by the retaining device 33 and thereby held back at least for the initial stretching apart of the item of laundry 10. After the item of laundry 10 is securely clamped on the depositing region 23 by activation of the clamping finger 34, the drive of the belt conveyors 27 to 32 of the conveyor cascade 24 is started.

The drive of the belt conveyors 27 to 32 lying one above another in pairs takes place at an increasing, preferably gradually increasing, conveying speed, as seen in the supply direction 12. For this purpose, the revolving speed of the runs of the central belt conveyors 28, 30 lying one above another is greater than the revolving speed of the runs of the pair of the initial belt conveyors 27 and 30, said runs facing one another. The revolving speed of the runs of the final pair in the supply direction 12 of belt conveyors 29 and 32 lying one above another is also greater than the revolving speed of the runs of the belt conveyors 28 and 31 lying one above another of the central pair of belt conveyors. By means of said transport speed of the belt conveyors 27 to 32 increasing gradually in the supply direction 12, when the item of laundry 10 is transported further by the belt conveyors 27 to 32 in the supply direction 12 the item of laundry 10 is gradually stretched apart. A slip of that portion of the item of laundry 10 which lies between pairs of belt conveyors 27 and 30 or 28 and 31 running more slowly is crucially involved in said stretching apart.

As soon as the stretching apart of the item of laundry 10 has progressed to such an extent that the force exerted by the clamping finger 34 of the retaining device 33 on the held part of the item of laundry 10 has assumed a certain size, the clamping finger 34 is released from the item of laundry 10 by being pivoted upward by the pneumatic cylinder 36 into the starting position shown in FIG. 2. Alternatively, it can also be provided that, as the spreading out, in particular stretching apart, continues, the item of laundry 10 is automatically released from the clamping finger 34 of the retaining device 33 by that part of the item of laundry 10 which is originally held by the clamping finger 34 being pulled away under the clamping finger 34.

At the latest when a transversely directed edge 43 of the item of laundry 10, said edge leading in the supply direction 12, has reached the end region, which faces the feeding machine 11, of the final pair of belt conveyors 29 and 32 lying one above another, the spreading device 14 has stretched apart and/or stretched the item of laundry 10 completely or at least to an extent sufficient for automatic transfer to the feeding machine 11. An automatic transfer of the stretched-apart item of laundry 10 from the spreading device 14 to the loading conveyor 38 of the feeding machine 11 then takes place, specifically preferably to the transfer region 41 of the lower belt conveyor 39 of the loading conveyor 38. This transfer takes place with the transverse edge 43 which lies at the front and is delimited on both sides by adjacent corners of the item of laundry 10.

Depending on the design of the feeding machine 11, either the leading transverse edge 43 or the trailing transverse edge 43 of the item of laundry 10 is spread by a spreader, not shown in the figures, of said feeding machine, wherein, by moving the spreading clips of the spreader apart, adjacent corners 20 and 42 of the rear transverse edge 43 or adjacent corners of the front transverse edge 43 are stretched apart transversely with respect to the supply direction 12 and the item of laundry 10 is completely spread out for the transfer of the item of laundry 10 in the spread-out state from the feeding machine 11 to the downstream mangle or other laundry treatment machine.

An alternative method is conceivable in which the first two belt conveyors 27 and 30 lying one above another of the conveyor cascade 24 can be reversed, specifically at least temporarily during the initial stretching apart of the item of laundry 10. The item of laundry 10 is then initially transported by the belt conveyors 27 and 30 counter to the supply direction 12 while the following belt conveyors 28 and 31 and 29 and 32 are driven in such a manner that they transport the item of laundry 10 further in the supply direction 12. The opposed driving of the first belt conveyors 27 and 30 counter to the supply direction 12 can take place not only during the initial stretching apart of the item of laundry 10 but optionally also during the entire stretching apart of the item of laundry 10. In said last-mentioned case, the first belt conveyors 27 and 30 lying one above the other are continuously driven counter to the supply direction 12.

With first belt conveyors 27 and 30 lying one above the other and reversible in the above-described manner or driven continuously in the opposite direction to the supply direction 12, the retaining device 33 with the pivotable clamping finger 34 can be omitted.

LIST OF REFERENCE NUMBERS

10 Item of laundry
11 Feeding machine
12 Supply direction
13 Separator
14 Spreading device
15 Laundry heap
16 Camera
17 Rising section
18 Gripper
19 Preparation device
20 First corner
21 Rail
22 Clip
23 Depositing region
24 Conveyor cascade
25 Sensor
26 Sensor beam
27 Lower belt conveyor
28 Lower belt conveyor
29 Lower belt conveyor
30 Upper belt conveyor
31 Upper belt conveyor
32 Upper belt conveyor
33 Retaining device
34 Clamping finger
35 Axis of rotation
36 Pneumatic cylinder
37 Guide plate
38 Loading conveyor
39 Lower belt conveyor
40 Upper belt conveyor
41 Transfer region
42 Second corner
43 Edge

What is claimed is:

1. A method for supplying an item of laundry (10) to a feeding machine (11) for spreading out and feeding the item of laundry (10) by two corners of a leading transverse edge into a laundry treatment device, comprising the steps of:
pulling the item of laundry (10) by at least one clip (22) over a spreading device (14), the spreading device (14) having a conveyor cascade (24) for stretching the item of laundry (10) in a supply direction (12), the conveyor cascade (24) having at least two pairs of conveyors which follow one another in the supply direction (12) to the feeding machine (11) and then into the laundry treatment device;
bringing the item of laundry (10) over the conveyor cascade (24) in the spreading device (14), and opening the at least one clip (22), resulting in the item of laundry (10) being deposited into a U-shaped configuration with end portions of the item of laundry (10) hanging down over both sides of the conveyor cascade (24), whereby the item of laundry (10) is deposited with a central region of the item of laundry (10) over a depositing region (23) of the conveyor cascade (24) such that the item of laundry (10) is located on the depositing region (23) in the U-shaped configuration with the end portions hanging down over both sides of the depositing region (23) of the conveyor cascade (24); and, in the process of bringing the item of laundry (10) over the conveyor cascade (24), the at least two pairs of conveyors which follow one another in the supply direction (12) stretch the item of laundry (10) apart in the supply direction (12) of supplying the item of laundry (10) to the feeding machine (11) and then into the laundry treatment device such that the two adjacent corners on the leading transverse edge of the item of laundry (10) are exposed.

2. The method as claimed in claim 1, wherein the item of laundry (10) hanging on the clip (22) is deposited with the central region of the item of laundry (10) over the depositing region (23) of the spreading device (14) by a movement of the clip (22) in a transverse direction with respect to the supply direction (12) of the item of laundry (10) to the feeding machine (11) and release of the clip (22), and, in the process, the item of laundry (10) is brought into the U-shaped configuration on the depositing region (23).

3. The method as claimed in claim 1, further comprising transporting the item of laundry (10) further at least in the supply direction (12) by the spreading device (14).

4. The method as claimed in claim 1, wherein the pairs of conveyors have lower belt conveyors (27 to 29) and upper belt conveyors (30 to 32), wherein the upper belt conveyors (30 to 32) are arranged above the lower belt conveyors (27 to 29).

5. The method as claimed in claim 4, wherein the lower belt conveyors (27 to 29) follow one another in the supply direction (12) and are at least partially operated at different transport speeds which increase, as seen in the supply direction (12), and the upper belt conveyors (30 to 32) follow one another in the supply direction (12) and are at least partially operated at different transport speeds which increase, as seen in the supply direction (12).

6. The method as claimed in claim 4, wherein a first of the belt conveyors (27) is driven counter to the supply direction (12) at least during the initial stretching apart of the item of laundry (10) in order to hold back the item of laundry (10) at least during the initial stretching apart of the item of laundry (10) by the at least another one of the belt conveyors (28 to 32).

7. The method as claimed in claim 1, wherein the item of laundry (10) is pulled into the U-shaped configuration onto a first belt conveyor (27) of the conveyor cascade (24) of the spreading device (14) and, at the location at which the item of laundry (10) has been pulled onto the first belt conveyor (27), an outer region of the item of laundry (10) is held back during at least the initial stretching apart of the item of laundry (10).

8. The method as claimed in claim 1, further comprising the step of separating the item of laundry from a heap of laundry items prior to the step of forming the two adjacent corners on the leading transverse edge of the item of laundry (10).

9. The method as claimed in claim 1, wherein the two adjacent corners on the leading transverse edge of the item of laundry (10) are fed first to the feeding machine, and the feeding machine then spreads out the item of laundry by the two adjacent corners and supplies the item of laundry (10) to the laundry treatment device.

10. An apparatus for supplying an item of laundry (10) to a feeding machine (11) for spreading and feeding the item of laundry (10) by two corners of a leading transverse edge into a laundry treatment device, the feeding machine (11) transporting the item of laundry (10) to the laundry treatment device in a supply direction (12), the apparatus comprising:

at least one conveyor cascade (24) which transports the respective item of laundry (10) in the supply direction (12), to the feeding machine (11), the conveyor cascade (24) having at least two pairs of conveyors (27 to 32) which follow one another in the supply direction to the feeding machine (11); and at least one clip (22) for hanging up a respective item of laundry (10);

wherein the conveyor cascade (24) comprises a front depositing region (23), and the conveyor cascade (24) extends from the depositing region (23) in the supply direction (12) towards the feeding machine (11), wherein the at least one clip (22) allows the item of laundry (10) to be deposited with a central region of the item of laundry (10) over the depositing region (23) of the conveyor cascade (24) such that the item of laundry (10) is located on the depositing region (23) in a U-shaped configuration with end portions of the item of laundry (10) hanging down over both sides of the depositing region (23) of the conveyor cascade (24), and wherein the transport speed of the conveyor cascade (24) increases in the supply direction (12) thereby stretching the item of laundry (10) apart in the supply direction (12) of supplying the item of laundry (10) to the feeding machine (11) and then into the laundry treatment device such that the two adjacent corners on the leading transverse edge of the item of laundry (10) are exposed.

11. The apparatus as claimed in claim 10, wherein the pairs of conveyors have lower belt conveyors (27 to 29) and upper belt conveyors (30 to 32), wherein the upper belt conveyors (30 to 32) are arranged above the lower belt conveyors (27 to 29).

12. The apparatus as claimed in claim 11, wherein at least a first belt conveyor (27) of the belt conveyors (27 to 32) can be driven at least temporarily counter to the supply direction (12).

13. The apparatus as claimed in claim 12, further comprising a retaining device (33) for a rear region of the item of laundry (10) which is lying on the first belt conveyor (27), the retaining device (33) being assigned to the first belt conveyor (27) in a starting region forming the depositing region (23).

14. The apparatus as claimed in claim 13, further comprising a controller that controls the retaining device (33) in such a manner that the retaining device (33) secures the rear region of the item of laundry (10) until the at least one of the belt conveyors (28, 31) which follows the first belt conveyor (27) exerts a certain tensile force on the rear region of the item of laundry (10) which is held by the retaining device (33).

15. The apparatus as claimed in claim 13, further comprising a controller that controls the retaining device (33) in such a manner that the retaining device (33) secures the rear region of the item of laundry (10) until the at least one pair of the belt conveyors (28, 31) lying one above another and following the first belt conveyor (27) exerts a certain tensile force on the rear region of the item of laundry (10) which is held by the retaining device (33).

16. The apparatus as claimed in claim 10, wherein the central region of the item of laundry (11) is deposited approximately centrally on the depositing region (23) of the conveyor cascade (24).

17. The apparatus as claimed in claim 16, wherein the conveyor cascade (24) comprises at least two pairs of lower belt conveyors (27, 28, 29) and upper belt conveyors (30, 31, 32) lying one above another.

* * * * *